(12) United States Patent
Choi et al.

(10) Patent No.: US 10,811,664 B2
(45) Date of Patent: Oct. 20, 2020

(54) BATTERY MODULE

(71) Applicants: HYUNDAI MOTOR COMPANY, Seoul (KR); KIA MOTORS CORPORATION, Seoul (KR)

(72) Inventors: Jun Seok Choi, Suwon-si (KR); Jin Won Kim, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 372 days.

(21) Appl. No.: 15/833,645

(22) Filed: Dec. 6, 2017

(65) Prior Publication Data
US 2019/0051884 A1 Feb. 14, 2019

(30) Foreign Application Priority Data
Aug. 8, 2017 (KR) .................. 10-2017-0100195

(51) Int. Cl.
*H01M 2/22* (2006.01)
*H01M 2/20* (2006.01)
*H01M 10/48* (2006.01)
*H01M 2/10* (2006.01)

(52) U.S. Cl.
CPC ........... *H01M 2/22* (2013.01); *H01M 2/1077* (2013.01); *H01M 2/206* (2013.01); *H01M 10/482* (2013.01); *H01M 2220/20* (2013.01)

(58) Field of Classification Search
None
See application file for complete search history.

(56) References Cited

U.S. PATENT DOCUMENTS

2017/0179458 A1* 6/2017 Sato .................... H01M 2/1077

FOREIGN PATENT DOCUMENTS

KR 2014-0015859 A 2/2014

* cited by examiner

*Primary Examiner* — Christopher P Domone
(74) *Attorney, Agent, or Firm* — Morgan, Lewis & Bockius LLP

(57) ABSTRACT

A battery module includes: a first battery cell and a second battery cell which have connection terminals, respectively, and are stacked to allow the connection terminals to face each other; and a connection bar having a first surface and a second surface interconnected to form a V-shaped cross-section. The connection terminal of the first battery cell is bonded to the first surface and the connection terminal of the second battery cell is bonded to the second surface.

7 Claims, 5 Drawing Sheets

BATTERY MODULE

CROSS REFERENCE TO RELATED APPLICATION

The present application claims the benefit of priority to Korean Patent Application No. 10-2017-0100195 filed on Aug. 8, 2017, the entire content of which is incorporated herein for all purposes by this reference.

TECHNICAL FIELD

The present disclosure relates to a battery module, and more specifically, to a battery module which employs two-sheet welding using a sub-bus bar for electrical connection between battery cells and connection of voltage sensing portions, so as to secure the reliability in electrical connection between the cells and the reliability in voltage sensing.

BACKGROUND

Recently, various methods have been applied to electrical connection between positive (+) and negative (−) electrodes between battery cells for a vehicle. For example, physical connection methods include bolt/nut fastening, clinching, molding, and the like, and welding methods include resistance welding, ultrasonic welding, laser welding, spot welding, and the like. With respect to the connection of electrodes, mass production, safety, and contact resistance of electrical connection should be considered. In this respect, particularly, a laser welding method has been often applied to mass production.

The laser welding method is generally based on fusing of a meta material using laser energy. The laser welding method includes two-sheet welding and three-sheet welding according to the number of overlapping sheets, and the two-sheet welding has high reliability in welding. However, the three-sheet welding has been partially applied to mass production through optimization of the adhesion and focus of an object to be welded and bonded.

The three-sheet welding adopts a voltage sensing structure having one line, for each cell, connected to a controller in order to monitor a state of cells in addition to welding between cell electrodes. Further, the three-sheet welding for voltage sensing is applied to mass production of a bus bar having a structure of cell AL tab+cell CU tab+voltage sensing.

The conventional three-sheet welding of a battery module is sensitive to welding conditions, reliability, and environmental conditions, and thus it is difficult to secure and maintain the quality by the three-sheet welding.

In addition, such a three-sheet welding method has a restriction in a welding gap between cells (at least 5 mm or more) and is thus unable to employ a welding structure using a sub-bus bar (a space of at least 5 mm for a counter bar is required for laser welding). In addition, it is difficult to adopt a structure for voltage sensing after welding between high currents, and an intercell welding structure partially has a cell tab as a separate welding structure for voltage sensing. Therefore, the weldability of three-sheet welding is reduced and welded portions are separated.

Therefore, there has been a need for a solution, which can solve problems such as welding deterioration and defects, which may occur in the three-sheet welding, and can secure and maintain the quality.

The foregoing description of the background art is only for the purpose of promoting understanding of the background of the present disclosure and should not to be construed as an admission that the description is the prior art which is already known to a person skilled in the art.

SUMMARY

The present disclosure has been proposed in order to solve such problems. An aspect of the present disclosure is to provide a battery module which employs two-sheet welding using a sub-bus bar for electrical connection between battery cells and connection of voltage sensing portions, so as to secure the reliability in electrical connection between the cells and the reliability in voltage sensing.

In order to achieve the aspect, a battery module according to the present disclosure includes: a first battery cell and a second battery cell which have connection terminals, respectively, and are stacked to allow the connection terminals to face each other; and a connection bar having a first surface and a second surface interconnected to form a V-shaped cross-section, wherein the connection terminal of the first battery cell is bonded to the first surface and the connection terminal of the second battery cell is bonded to the second surface.

An end portion of the connection terminal of the first battery cell is bent toward the second battery cell and bonded to the first surface, and an end portion of the connection terminal of the second battery cell is bent toward the first battery cell and bonded to the second surface.

The battery module further includes a wire electrically connected to the connection bar and sensing voltage of the first battery cell and the second battery cell.

A battery module according to the present disclosure includes: a first battery cell and a second battery cell which have connection terminals, respectively, and are stacked to face each other; and a connection bar having a first surface and a second surface, having a shape bent at a predetermined angle with reference to a center axis where the first surface and the second surface meet, and disposed between connection terminals of the stacked first battery cell and second battery cell, wherein a connection terminal of the first battery cell is bonded to the first surface and a connection terminal of the second battery cell is bonded to the second surface.

An end portion of the connection terminal of the first battery cell is bent toward an interface between the stacked battery cells and bonded to the first surface, and an end portion of the connection terminal of the second battery cell is bent toward the interface between the stacked battery cells and bonded to the second surface.

The battery module further includes a wire electrically connected to the connection bar and sensing voltage of the first battery cell and the second battery cell.

A battery module according to the present disclosure includes: a first battery cell and a second battery cell, each of which has a negative electrode connection terminal and a positive electrode connection terminal, the first battery cell and the second battery cell being stacked; and a connection bar disposed between a negative electrode connection terminal of the first battery cell and a positive electrode connection terminal of the second battery cell, which are located at an identical side of the battery module, and bent toward an interface between the stacked battery cells to have two surfaces with reference to a center axis around which the bending is performed, wherein the negative electrode connection terminal of the first battery cell is bent toward the positive electrode connection terminal of the second battery cell and bonded to one surface of the connection bar, and the positive electrode connection terminal of the second battery cell is bent toward the negative electrode connection terminal of the first battery cell and bonded to the other surface of the connection bar.

An end portion of the negative electrode connection terminal of the first battery cell has a shape bent to be bonded to one surface of the connection bar, and an end portion of the positive electrode connection terminal of the second battery cell has a shape bent to be bonded to the other surface of the connection bar.

The battery module further includes a wire electrically connected to the connection bar and sensing voltage of the first battery cell and the second battery cell.

A battery module of the present disclosure employs two-sheet welding using sub-bus bar for electrical connection between battery cells and connection of voltage sensing portions. Therefore, the battery module can secure the reliability in electrical connection between the cells and the reliability in voltage sensing.

In addition, the welding may be performed at 45 degrees or at a predetermined angle in the welding direction. Therefore, even when the gap between the cells is small, a predetermined angle for the welding can be applied.

In addition, the battery module employs a bonding structure between a connection terminal and a connection bar, which can increase an area of a unit cell and thus reduce a thickness of a cell, thereby reducing the resistance of the unit cell. That is, the present disclosure employs a large area cell and thus can maximize the output/discharge power.

In addition, the battery module employs a two-sheet welding structure for connection between a connection bar and a connection terminal of each battery cell, and thus can ensure the quality.

Further, the battery module employs a welding structure using a connection bar, and thus enables voltage sensing through direct connection of a wire and the connection bar. Therefore, the battery module can prevent the occurrence of quality-related issues of a conventional welding method, such as welding deterioration and defects.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, a battery module according to various embodiments of the present disclosure will be described with reference to the accompanying drawings.

Figure 1:
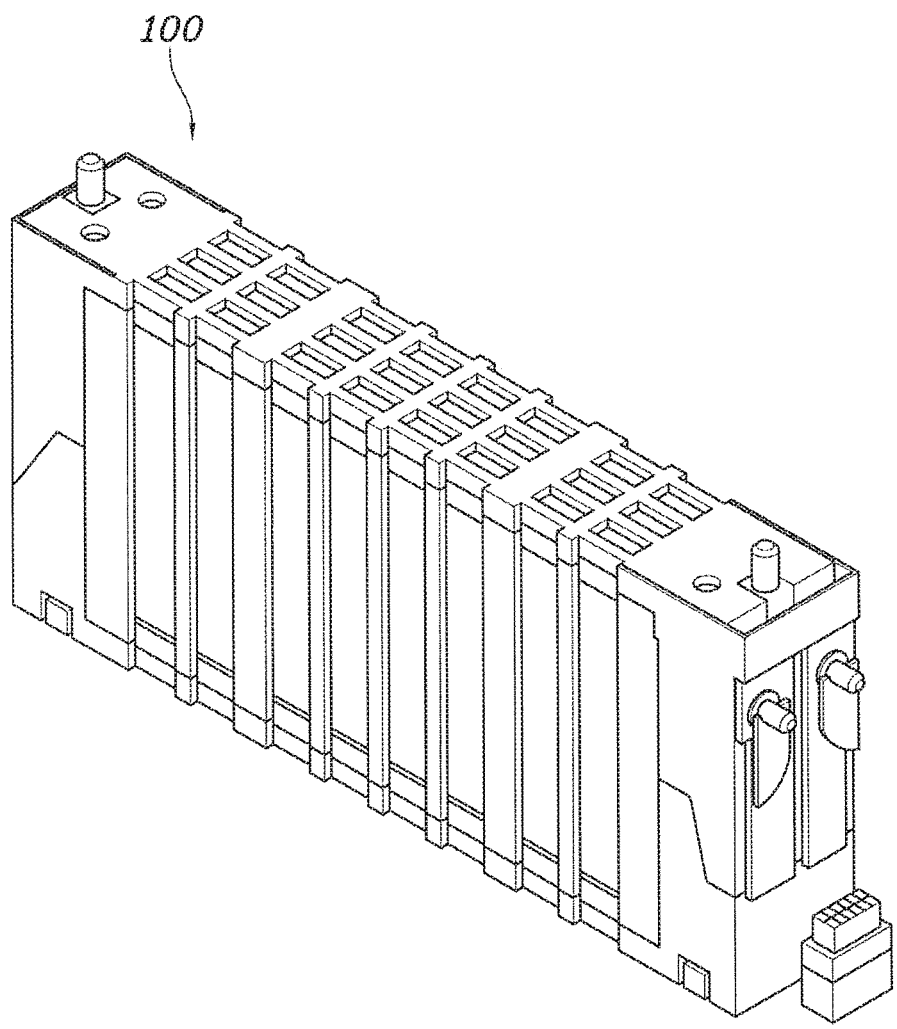
FIG. 1 is a perspective view of a battery module according to an embodiment of the present disclosure.
Figure 2:
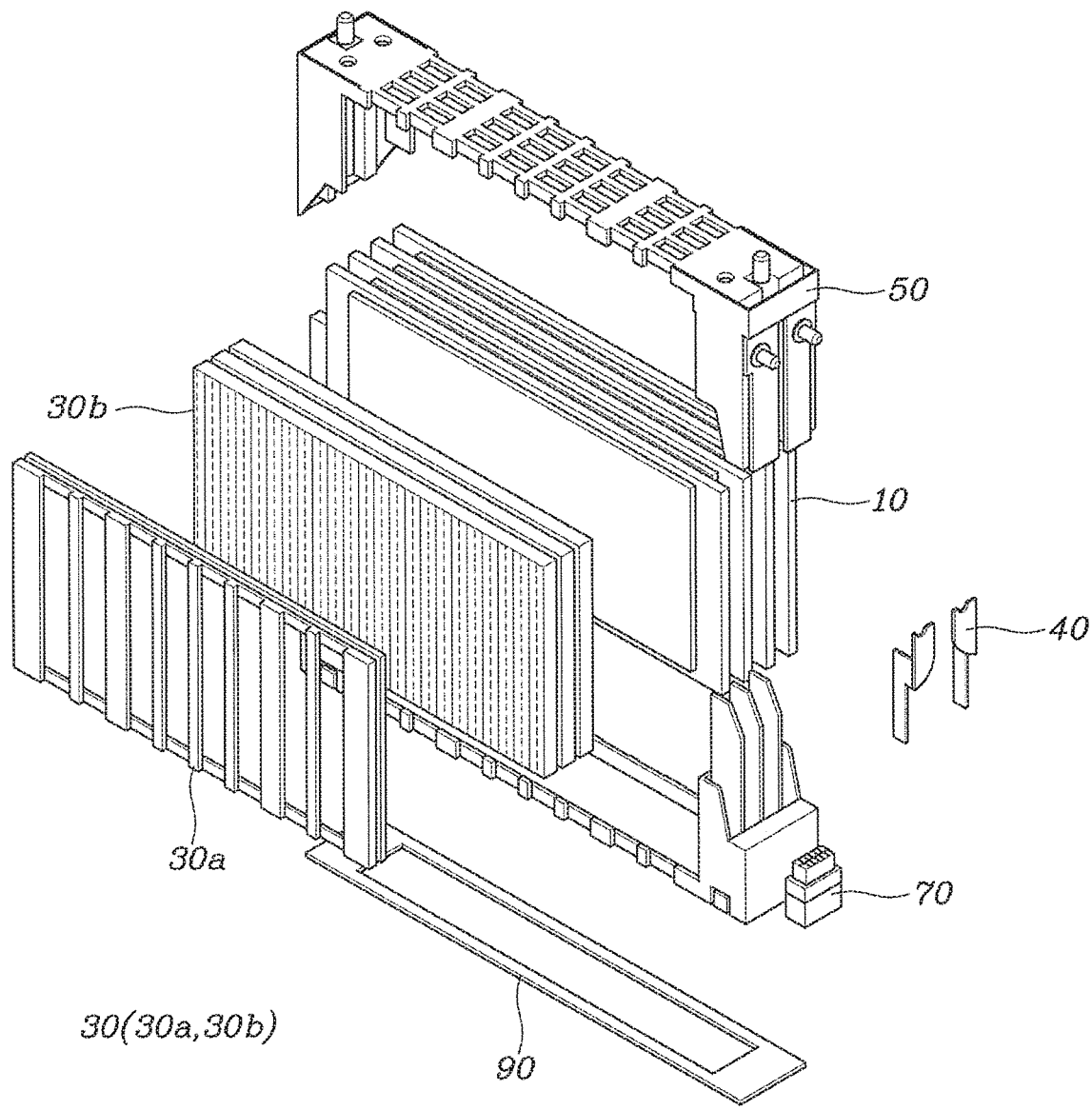
FIG. 2 is an exploded perspective view of a battery module according to an embodiment of the present disclosure.
Figure 3:
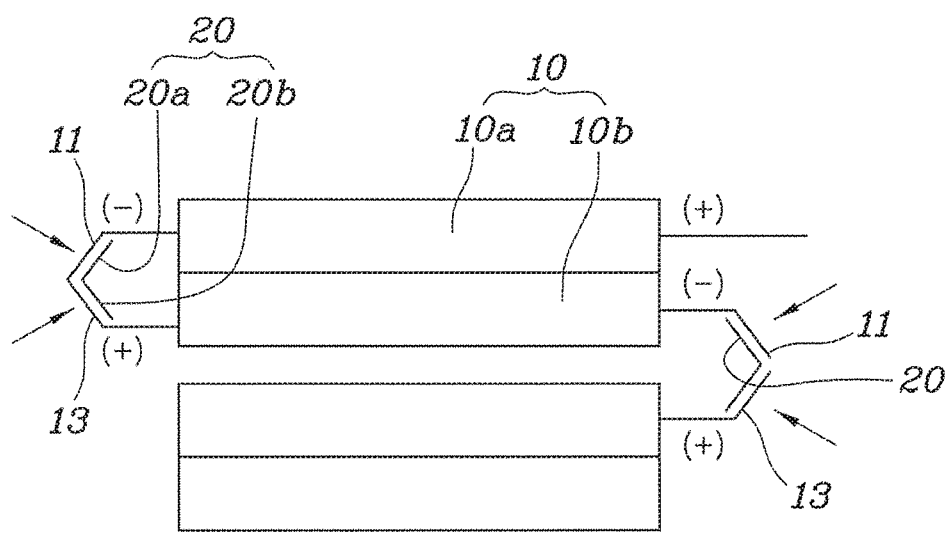
FIGS. 3 to 5 are views for explaining a battery module according to an embodiment of the present disclosure.
Figure 4:
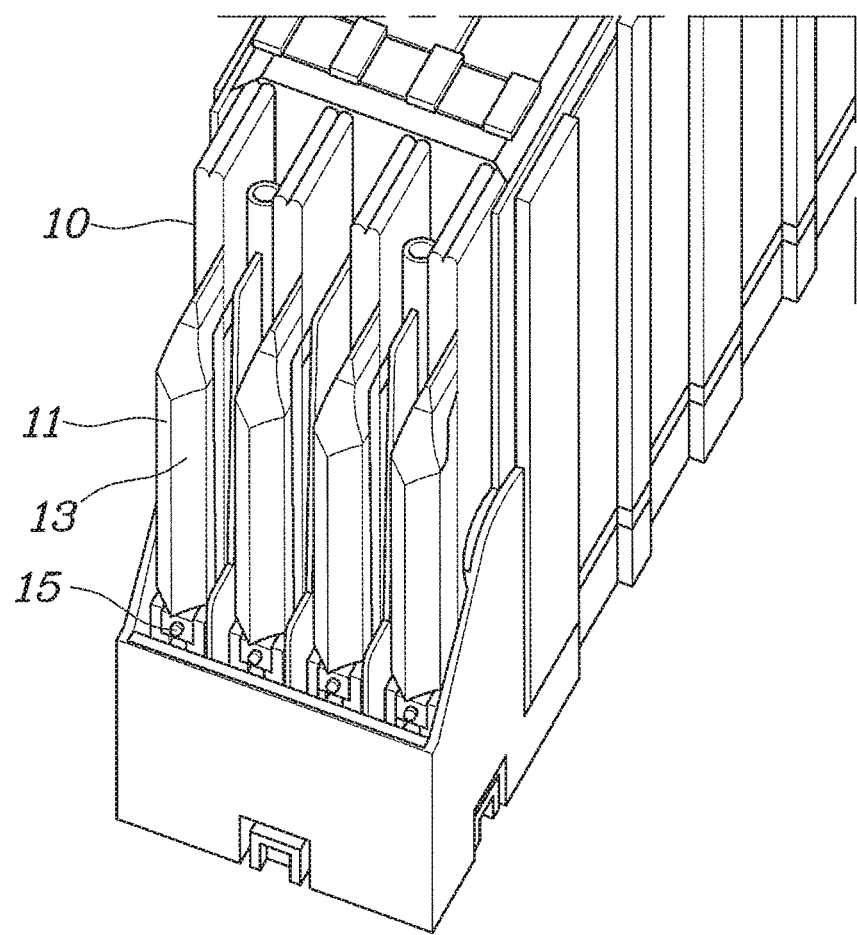
Figure 5:
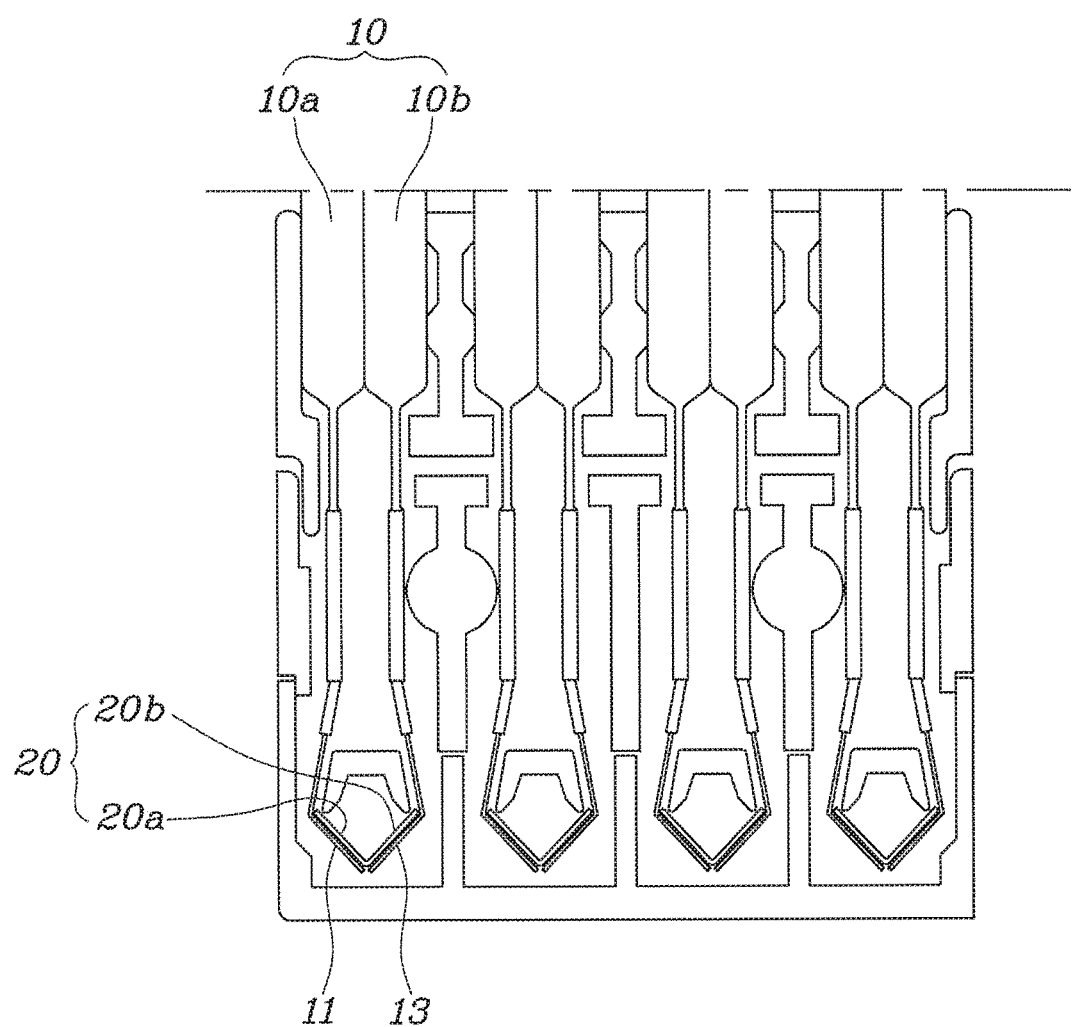

FIG. 1 is a perspective view of a battery module according to an embodiment of the present disclosure, and FIG. 2 is an exploded perspective view of a battery module according to an embodiment of the present disclosure. FIGS. 3 to 5 are views for explaining a battery module according to an embodiment of the present disclosure.

Referring to FIGS. 1 and 2, a battery module 100 of the present disclosure may include a battery cell 10, a cartridge 30, a bus bar 40, an upper case 50, a lower case 70, and a bottom cover 90.

Referring to FIG. 3, a battery module according to an embodiment of the present disclosure includes: a first battery cell 10a and a second battery cell 10b which have connection terminals 11 and 13, respectively, and are stacked to allow the connection terminals 11 and 13 to face each other; and a connection bar 20 having a first surface 20a and a second surface 20b interconnected to form a V-shaped cross-section, wherein a connection terminal 11 of the first battery cell 10a is bonded to the first surface 20a and a connection terminal 13 of the second battery cell 10b is bonded to the second surface 20b.

The battery cell 10 has a negative electrode connection terminal 11 and a positive electrode connection terminal 13 which are electrode terminals. The battery module 100 has a plurality of battery cells 10 stacked on each other, wherein connection terminals 11 and 13 between stacked battery cells 10 are not directly connected to each other, but are welded to be connected through the connection bar 20. Specifically, the connection terminal 11 of the first battery cell 10a and the connection terminal 13 of the second battery cell 10b have end portions having a shape bent to be bonded to the connection bar 20, which will be described later, and the bending angle thereof may be changed depending on a degree of bending of the connection bar 20, as described later.

The connection bar 20, as a sub-bus bar, has a structure having a first surface 20a and a second surface 20b interconnected to form a V-shaped cross-section. An end portion of the connection terminal 11 of the first battery cell 10a is bent toward the second battery cell 10b and bonded to the first surface 20a, and an end portion of the connection terminal 13 of the second battery cell 10b is bent toward the first battery cell 10a and bonded to the second surface 20b, so that electrical connection is formed between the connection terminals 11 and 13 of the battery cells 10a and 10b.

As an embodiment of the present disclosure, the bonding between the connection terminals 11 and 13 of the battery cells 10a and 10b and the surfaces 20a and 20b of the connection bar 20 may be achieved by laser welding. The welding may be performed at 45 degrees or at a predetermined angle in the welding direction as indicated by the arrows in FIG. 3. Therefore, even when the gap between the cells is small, a predetermined angle for the welding can be applied.

The battery module employs a bonding structure between the connection terminals 11 and 13 and the connection bar 20, which can increase an area of a unit cell and thus reduce a thickness of a cell, thereby reducing the resistance of the unit cell. Furthermore, the present disclosure employs a large area cell and thus can maximize the output/discharge power.

A bending angle of the connection 20 may be variously set in consideration of a thickness of a cell.

As an embodiment of the present disclosure, a series connection structure, in which battery cells 10 connected by a connection bar 20 are repeated, may be formed as shown in FIG. 3.

A structure of a battery cell 10 and a connection bar 20 will be described in detail with reference to FIGS. 4 and 5. First, in FIG. 4, the connection terminals 11 and 13 of the battery cells 10 are bent, and the connection bar 20 is bonded between the connection terminals 11 and 13 through welding. FIG. 5 is a cross-sectional view of a battery module. The battery module includes: a first battery cell 10a and a second battery cell 10b which have connection terminals 11 and 13, respectively, and are stacked to face each other; and a connection bar 20 having a first surface 20a and a second surface 20b, having shape bent at a predetermined angle with reference to a center axis where the first surface 20a and the second surface 20b meet, and disposed between connection terminals 11 and 13 of the stacked first battery cell 10a and second battery cell 10b, wherein a connection terminal 11 of the first battery cell 10a is bonded to the first surface 20a and a connection terminal 13 of the second battery cell 10b is bonded to the second surface 20b.

In this case, the battery module may employ a two-sheet welding structure for connection between the connection bar 20 and the connection terminals 11 and 13 of the battery cells 10a and 10b (Cu (connection bar 20)+Al (connection terminal 11) or Cu (connection bar 20)+Cu (connection terminal 13)), and thus can ensure the quality.

A battery module according to the present disclosure includes: a first battery cell 10a and a second battery cell 10b, each of which has a negative electrode connection terminal 11 and a positive electrode connection terminal 13, the first battery cell 10a and the second battery cell 10b being stacked; and a connection bar 20 disposed between a negative electrode connection terminal 11 of the first battery cell 10a and a positive electrode connection terminal 13 of the second battery cell 10b, which are located at an identical side of the battery module, and bent toward an interface between the stacked battery cells 10a and 10b to have two surfaces 20a and 20b with reference to a center axis around which the bending is performed, wherein the negative electrode connection terminal 11 of the first battery cell 10a is bent toward the positive electrode connection terminal 13 of the second battery cell 10b and bonded to one surface 20a of the connection bar 20, and the positive electrode connection terminal 13 of the second battery cell 10b is bent toward the negative electrode connection terminal 11 of the first battery cell 10a and bonded to the other surface 20b of the connection bar 20.

The battery module according to an embodiment of the present disclosure further includes a wire 15 electrically connected to the connection bar 20 and sensing voltage of the first battery cell 10a and the second battery cell 10b. Further, the battery module employs the welding structure using the connection bar 20, which is described above, and thus enables voltage sensing through direct connection of the wire 15 and the connection bar 20. Therefore, the battery module can prevent the occurrence of quality-related issues of a conventional welding method, such as welding deterioration and defects.

As described above, a battery module according to various embodiments of the present disclosure employs two-sheet welding for electrical connection between battery cells and connection of voltage sensing portions, so as to secure the reliability in electrical connection between the cells and the reliability n voltage sensing.

In addition, the welding may be performed at 45 degrees or at a predetermined angle in the welding direction. Therefore, even when the gap between the cells is small, a predetermined angle for the welding can be applied.

In addition, the battery module employs a bonding structure between a connection terminal and a connection bar, which can increase an area of a unit cell and thus reduce a thickness of a cell, thereby reducing the resistance of the unit cell. That is, the present disclosure employs a large area cell and thus can maximize the output/discharge power.

In addition, the battery module employs a two-sheet welding structure for connection between a connection bar and a connection terminal of each battery cell, and thus can ensure the quality.

Further, the battery module employs a welding structure using a connection bar, and thus enables voltage sensing through direct connection of a wire and the connection bar. Therefore, the battery module can prevent the occurrence of quality-related issues of a conventional welding method, such as welding deterioration and defects.

Although the present disclosure has been shown and described with respect to the specific embodiments thereof, it will be apparent to a person skilled in the art that various modifications and variations can be made in the present disclosure without departing from the technical idea of the present disclosure, which is provided by the following claims.

What is claimed is:

1. A battery module comprising:
    a first battery cell and a second battery cell which have connection terminals, respectively, and are stacked to allow the connection terminals to face each other; and
    a connection bar having a first surface and a second surface interconnected to form a V-shaped cross-section,
    wherein the connection terminal of the first battery cell is bonded to the first surface and the connection terminal of the second battery cell is bonded to the second surface, and
    wherein an end portion of the connection terminal of the first battery cell is bent toward the second battery cell and bonded to the first surface, and an end portion of the connection terminal of the second battery cell is bent toward the first battery cell and bonded to the second surface.

2. The battery module of claim 1, further comprising a wire electrically connected to the connection bar and sensing voltage of the first battery cell and the second battery cell.

3. A battery module comprising:
    a first battery cell and a second battery cell which have connection terminals, respectively, and are stacked to face each other; and
    a connection bar having a first surface and a second surface, having a shape bent at a predetermined angle with reference to a center axis where the first surface and the second surface meet, and disposed between connection terminals of the stacked first battery cell and second battery cell,
    wherein a connection terminal of the first battery cell is bonded to the first surface and a connection terminal of the second battery cell is bonded to the second surface, and
    wherein an end portion of the connection terminal of the first battery cell is bent toward an interface between the stacked battery cells and bonded to the first surface, and an end portion of the connection terminal of the second battery cell is bent toward the interface between the stacked battery cells and bonded to the second surface.

4. The battery module of claim 3, further comprising a wire electrically connected to the connection bar to deliver voltage information of the first battery cell and the second battery cell.

5. A battery module comprising:
    a first battery cell and a second battery cell, each of which has a negative electrode connection terminal and a positive electrode connection terminal, the first battery cell and the second battery cell being stacked; and a connection bar disposed between a negative electrode connection terminal of the first battery cell and a positive electrode connection terminal of the second battery cell, the negative electrode connection terminal and the positive electrode connection terminal being located at an identical side of the battery module, and bent toward an interface between the stacked battery cells to have two surfaces with reference to a center axis around which the bending is performed, wherein the negative electrode connection terminal of the first battery cell is bent toward the positive electrode connection terminal of the second battery cell and bonded to one surface of the connection bar, and the positive electrode connection terminal of the second battery cell is bent toward the negative electrode connection terminal of the first battery cell and bonded to the other surface of the connection bar.

6. The battery module of claim 5, wherein an end portion of the negative electrode connection terminal of the first battery cell has a shape bent to be bonded to the one surface of the connection bar, and an end portion of the positive electrode connection terminal of the second battery cell has a shape bent to be bonded to the other surface of the connection bar.

7. The battery module of claim 5 further comprising a wire electrically connected to the connection bar to deliver voltage information of the first battery cell and the second battery cell.

\* \* \* \* \*